(12) United States Patent
Lee et al.

(10) Patent No.: US 8,751,756 B2
(45) Date of Patent: Jun. 10, 2014

(54) METHOD AND APPARATUS FOR WRITING DATA IN MEMORY SYSTEM

(75) Inventors: Yangsup Lee, Hwaseong-si (KR); Wonmoon Cheon, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 174 days.

(21) Appl. No.: 13/421,938

(22) Filed: Mar. 16, 2012

(65) Prior Publication Data

US 2012/0239889 A1    Sep. 20, 2012

(30) Foreign Application Priority Data

Mar. 18, 2011 (KR) .......................... 10-2011-0024427

(51) Int. Cl.
*G06F 12/02* (2006.01)
(52) U.S. Cl.
CPC .................................. *G06F 12/0246* (2013.01)
USPC ....................................................... 711/154
(58) Field of Classification Search
CPC ................................................. G06F 12/0246
See application file for complete search history.

(56) References Cited

U.S. PATENT DOCUMENTS

| 8,094,500 B2* | 1/2012 | Paley et al. ............... 365/185.12 |
| 2006/0206896 A1 | 9/2006 | Fontijn |
| 2009/0251725 A1 | 10/2009 | Kuwahara et al. |
| 2009/0254507 A1 | 10/2009 | Hosoya et al. |
| 2010/0088574 A1* | 4/2010 | Kim et al. ...................... 714/763 |
| 2010/0153632 A1* | 6/2010 | Lee et al. ...................... 711/103 |

FOREIGN PATENT DOCUMENTS

| JP | 2000029649 | 1/2000 |
| JP | 2009251725 | 10/2009 |
| KR | 1020050122251 A | 12/2005 |
| KR | 1020100007409 A | 1/2010 |

* cited by examiner

*Primary Examiner* — Hiep Nguyen
(74) *Attorney, Agent, or Firm* — Volentine & Whitt, PLLC

(57) ABSTRACT

A method of writing data in a memory system comprises determining a characteristic of write data and generating characteristic information according to the determined characteristic, generating a write command corresponding to the write data, and sending the write command, the characteristic information, and the write data to the memory system.

20 Claims, 12 Drawing Sheets

Fig. 7

Command Header

| Bit | Description |
|---|---|
| 31:04 | Reserved |
| 03 | Pattern |
| 02 | Compression |
| 01 | Multimedia |
| 00 | Duplication |

Attribute

| Bit | Description |
|---|---|
| 31:26 | Reserved |
| 25:18 | Data Pattern |
| 17:16 | Length in LBA |
| 15:08 | Starting LBA |
| 07:00 | Staring LBA of Source data |

METHOD AND APPARATUS FOR WRITING DATA IN MEMORY SYSTEM

CROSS-REFERENCE TO RELATED APPLICATIONS

This application claims priority under 35 U.S.C §119 to Korean Patent Application No. 10-2011-0024427 filed on Mar. 18, 2011, the disclosure of which is hereby incorporated by reference.

BACKGROUND OF THE INVENTION

Embodiments of the inventive concept relate generally to electronic data storage technologies. More particularly, embodiments of the inventive concept relate to methods and apparatuses for writing data in a memory system.

There is a continuing demand for data storage devices having higher performance and data storage capacity. Examples of such data storage devices include hard disk drives (HDDs), optical disk drives (ODDs), and semiconductor memory devices.

Semiconductor memory devices can be roughly divided into two categories according to whether they retain stored data when disconnected from power. These categories include volatile memories, which lose stored data when disconnected from power, and nonvolatile memories, which retain stored data when disconnected from power. Examples of volatile memories include static random access memory (SRAM), dynamic random access memory (DRAM), and synchronous DRAM (SDRAM). Examples of nonvolatile memories include read only memory (ROM), a programmable ROM (PROM), electrically programmable ROM (EPROM), electrically erasable and programmable ROM (EEPROM), and flash memory.

A data storage device is typically connected with a host such as a personal computer. The host typically stores, reads, and erases various types of data in the data storage device. Accordingly, one way to improve the performance of a data storage device is to improve the way it interoperates with a host.

SUMMARY OF THE INVENTION

In one embodiment of the inventive concept, a method is provided for writing data in a memory system. The method comprises determining a characteristic of write data and generating characteristic information according to the determined characteristic, generating a write command corresponding to the write data, and transmitting the write command, the characteristic information, and the write data to the memory system.

In another embodiment of the inventive concept, a method is provided for writing data in a memory system comprising a storage device and a controller configured to control the storage device. The method comprises receiving a write command, write data, and characteristic information indicating a characteristic of the write data, determining a write method of the received write data according to the received characteristic information, and writing the received write data in the storage device according to the determined write method.

In another embodiment of the inventive concept, a memory system comprises a storage device configured to store data, and a controller configured to control the storage device, wherein the controller receives a write command, write data, and characteristic information indicating a characteristic of the write data, determines a write method of the received write data according to the received characteristic information, and writes the received write data in the storage device according to the determined write method.

In another embodiment of the inventive concept, a method of writing data in a system including a host, a storage device and a controller comprises determining a characteristic of write data and generating characteristic information according to the determined characteristic by the host; generating a write command corresponding to the write data by the host; transmitting the write command, the characteristic information, and the write data from the host to the controller; determining a write method of the received write data according to the received characteristic information by the controller; and writing the received write data in the storage device according to the determined write method.

These and other embodiments of the inventive concept can potentially improve the performance of a memory system by modifying the way it performs write operations according to different circumstances.

BRIEF DESCRIPTION OF THE DRAWINGS

The drawings illustrate selected embodiments of the inventive concept. In the drawings, like reference numbers indicate like features unless the context indicates otherwise.

FIG. 7 is a diagram illustrating a characteristic command generated by a host according to an embodiment of the inventive concept.

DETAILED DESCRIPTION

Embodiments of the inventive concept are described below with reference to the accompanying drawings. These embodiments are presented as teaching examples and should not be construed to limit the scope of the inventive concept.

In the description that follows, the terms first, second, third, etc. may be used to describe various features, but these features should not be limited by these terms. Rather, these terms are used merely to distinguish between different features. Thus, a first feature discussed below could be termed a second feature without departing from the provided teachings.

The terminology used herein is for the purpose of describing particular embodiments only and is not intended to be limiting of the inventive concept. As used herein, the singular forms "a", "an" and "the" are intended to encompass the plural forms as well, unless the context clearly indicates otherwise. Terms such as "comprises", "comprising," "includes" and "including", when used in this specification, specify the presence of stated features, but they do not preclude the presence or addition of one or more other features. As used herein, the term "and/or" indicates any and all combinations of one or more of the associated listed items.

Where a feature is referred to as being "on", "connected to", "coupled to", or "adjacent to" another feature, it can be directly on, connected, coupled, or adjacent to the other feature, or intervening features may be present. In contrast, where a feature is referred to as being "directly on," "directly connected to", "directly coupled to", or "immediately adjacent to" another feature, there are no intervening features present.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or this specification and will not be interpreted in an idealized or overly formal sense unless expressly so defined herein.

Figure 1:
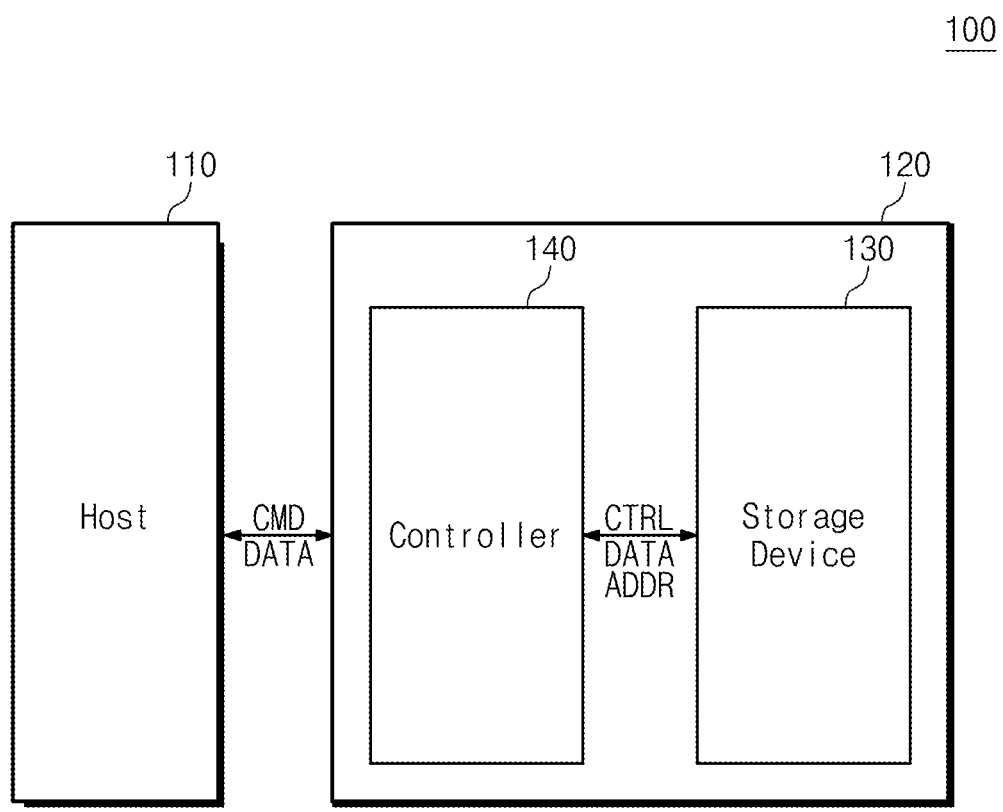
FIG. 1 is a block diagram illustrating a computing system according to an embodiment of the inventive concept.

FIG. 1 is a block diagram illustrating a computing system 100 according to an embodiment of the inventive concept. Referring to FIG. 1, computing system 100 comprises a host 110 and a memory system 120.

Host 110 is configured to store data in memory system 120 and to access data stored therein. This is typically accomplished by transferring a command CMD to memory system 120 and exchanging data with memory system 120. For example, host 110 may send a read command, a write command, or an erase command to memory system 120. Host 110 may also send attribute information representing an attribute of write data to the memory system together with the write command and write data. The attribute information may be an attribute command. Host 110 can also send a read command to memory system 120 and receive read data from memory system 120.

Host 100 can be a data processing device such as a personal computer, a notebook computer, an Ultra Mobile PC (UMPC), a workstation, a net-book, a personal digital assistant (PDA), a web tablet, a wireless phone, a mobile phone, a smart phone, an e-book, a portable multimedia player (PMP), a digital camera, a digital audio recorder/player, a digital picture/video recorder/player, a portable game machine, a navigation system, a black box, a 3-dimensional television, a digital audio recorder, or a digital audio player.

Memory system 120 is configured to read, write, and erase data under the control of host 110. Memory system 120 comprises a storage device 130 and a controller 140.

Controller 140 is configured to control storage device 130, and it functions as an interface between storage device 130 and host 110. Controller 140 sends a control signal CTRL and an address ADDR to storage device 130 and exchanges data with storage device 130.

Storage device 130 performs read, write, and erase operations in response to a control signal CTRL and an address ADDR input from controller 140. Storage device 130 stores data transferred from controller 140 and outputs read data to controller 140. Storage device 130 can send various response signals to controller 140.

Storage device 130 can be, for instance, a hard disk drive (HDD), a magnetic tape, a solid state drive (SSD), an electrically programmable erasable read only memory (EEPROM), a flash memory device, a phase-change RAM (PRAM), a magnetic RAM (MRAM), a resistive RAM (RRAM), or a ferroelectric RAM (FRAM).

Figure 2:
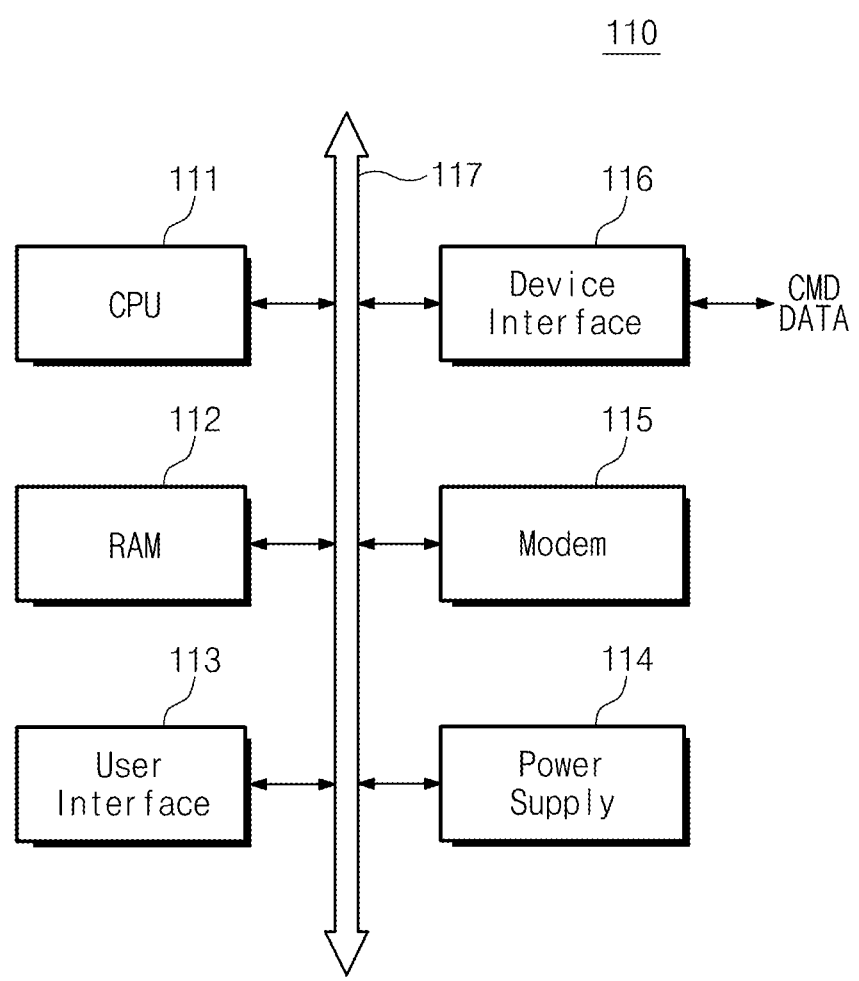
FIG. 2 is a block diagram illustrating a host in FIG. 1 according to an embodiment of the inventive concept.

FIG. 2 is a block diagram illustrating host 110 of FIG. 1 according to an embodiment of the inventive concept. Referring to FIGS. 1 and 2, host 110 comprises a CPU 111, a RAM 112, a user interface 113, a power supply 114, a modem 115, a device interface 116, and a system bus 117.

CPU 111 controls overall operations of host 110. RAM 112 stores data processed by CPU 111. RAM 112 can be formed of a volatile memory such as an SRAM, a DRAM, or an SDRAM, or a nonvolatile memory such as a PRAM an MRAM, an RRAM, an FRAM, or a NOR flash memory.

User interface 113 allows a user to access host 110. User interface 113 can include, for instance, a keyboard, a mouse, a touch pad, a button, a touch screen, a microphone, a camera, a sensor, and the like, and a user output interface such as a screen, a speaker, a motor, a ramp, or a beam projector.

Power supply 114 supplies power to host 110.

Modem 115 allows host 110 to communicate with an external device. Modem 115 can communicate with the external device via a wireless or wired communication channel. Modem 115 can communicate with the external device using a protocol such as global system for mobile communication (GSM), code division multiple access (CDMA), asymmetric digital subscriber line (ADSL), Ethernet, wireless fidelity (Wi-Fi), very high-bit rate digital subscriber line (VDSL), world interoperability for microwave access (WiMAX), or long term evolution (LTE).

Device interface 116 provides an interface for an external device such as memory system 120. For example, host 110 can transfer command CMD and data to memory system 120 via device interface 116, and it can receive data from memory system 120 via device interface 116.

System bus 117 provides a communication channel between other elements of host 110.

Figure 3:
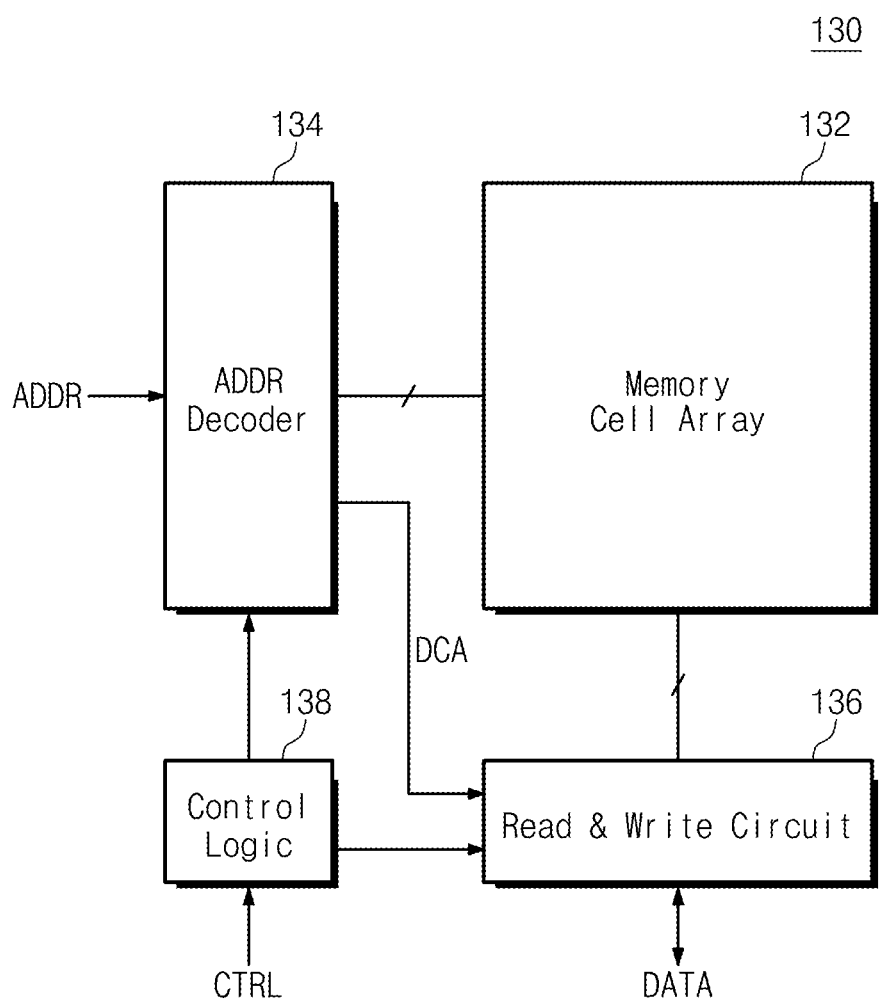
FIG. 3 is a block diagram illustrating a storage device in FIG. 1 according to an embodiment of the inventive concept.

FIG. 3 is a block diagram illustrating storage device 130 of FIG. 1 according to an embodiment of the inventive concept. Storage device 130 can be a semiconductor memory, for example. Nevertheless, storage device 130 is not limited to being a semiconductor memory.

Referring to FIGS. 1 and 3, storage device 130 comprises a memory cell array 132, an address decoder 134, a read/write circuit 136, and control logic 138.

Memory cell array 132 is connected to address decoder 134 and read/write circuit 136 via a plurality of conductive lines. Memory cell array 132 comprises a plurality of memory cells. Memory cells arranged in a row direction are connected with address decoder 134 via a plurality of conductive lines. For example, these memory cells may be connected with address decoder 134 via word lines. Memory cells arranged in a column direction may be connected with read/write circuit 136 via a plurality of conductive lines. For example, these memory cells may be connected with read/write circuit 136 via bit lines.

Address decoder 134 is configured to operate under the control of control logic 138. Address decoder 134 receives address ADDR from controller 140, and it decodes a row address of address ADDR. Address decoder 134 then selects rows of memory cells of memory cell array 132 using the decoded row address.

Address decoder 134 also decodes a column address of input address ADDR, and it provides a decoded column address DCA to read/write circuit 136. Address decoder 134 typically comprises a row decoder, a column decoder, an address buffer.

Read/write circuit 136 is operates under the control of control logic 138. Read/write circuit 136 receives decoded column address DCA from address decoder 134, and it selects columns of memory cells of memory cell array 132 based on decoded column address DCA.

Read/write circuit 136 receives data from controller 140 and writes the data in memory cell array 110. Read/write circuit 136 can also read data from memory cell array 110 and outputs the read data to controller 140. Read/write circuit 136 can also read data from a first storage area of memory cell array 110 to write it in a second storage area in a copy-back operation.

In some embodiments, read/write circuit 136 comprises a page buffer (or, a page register), a column selector circuit, and/or a data buffer. In other embodiments, read/write circuit 136 comprises a sense amplifier, a write driver, a column selector circuit, and/or a data buffer.

Control logic 138 is connected with address decoder 134 and read/write circuit 136. Control logic 138 is configured to control overall operations of storage device 130. Control logic 138 operates responsive to a control signal CTRL transferred from controller 140.

Figure 4:
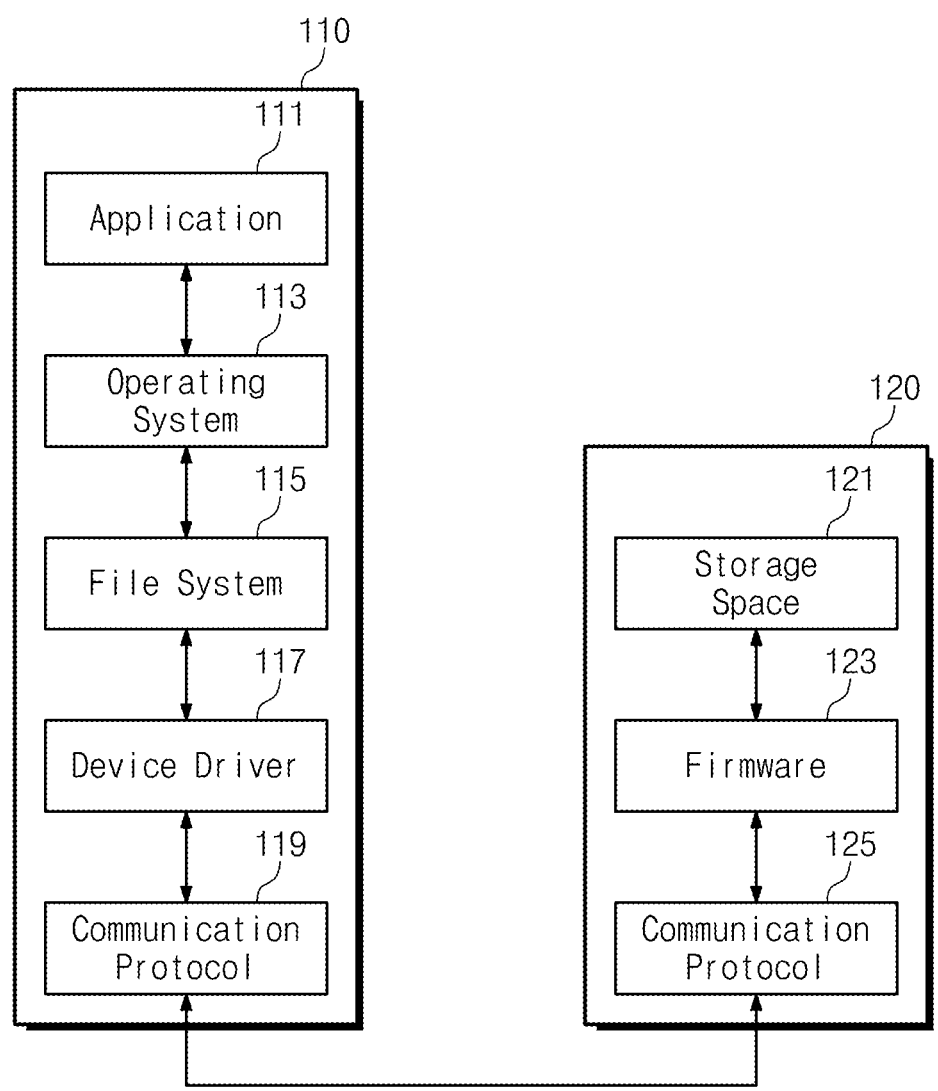
FIG. 4 is a diagram of software layers in the computing system of FIG. 1 according to an embodiment of the inventive concept.

FIG. 4 is a diagram of software layers in computing system 100 of FIG. 1.

Referring to FIG. 4, software layers within host 110 include an application 111, an operating system 113, a file system 115, a device driver 117, and a communication protocol 119.

Application 111 can comprise various programs to be run by host 110. For example, application 111 can include a word processor, a spread sheet, a file viewer, an image viewer, a sound player, or an image player.

Operating system 113 controls operations of host 110. For example, operating system 113 can control hardware of host 110 and provide an environment where application 111 is run. Operating system 113 can be, for instance, Windows, MacOS, Linux, DOS, android, Symbian, Bada, Unix, Virtual Memory System (VMS), OS/2, Solaris, Palm OS, Berkeley Software Distribution (BSD), iPhone OS, iPad OS, chrome OS, or any of various other operating systems.

File system 115 operates under the control of operating system 113. File system 115 manages memory system 120 connected with host 110 and data stored in memory system 120. File system 115 can be, for instance, File Allocation Table (FAT), FAT32, New Technology File System (NTFS), Hierarchical File System (HFS), XFS, Journaled File System (JFS), On-Disk Structure 2 (ODS-2), ODS-5, Universal Disk Format (UDF), Veritas, Quick File System (QFS), ZFS, Unix File System (UFS), second edition file system (ext2), ext3, ext4, ReiserFS, Reiser4, Global File System (GFS), GFS2, Oracle Cluster File System (OCFS), OCFS2, New Implementation of a Log-structured File System (NILFS), ISO 9660, Virtual File System (VFS), Gnome VFS, Be File System (BFS), or any of various other file systems.

Device driver 117 enables file system 115 to access memory system 120.

Communication protocol 119 is used to implement communication between host 110 and memory system 120. Communication protocol 119 can be, for instance, Universal Serial Bus (USB) protocol, multimedia card (MMC) protocol, peripheral component interconnection (PCI) protocol, PCI-express (PCI-E) protocol, Advanced Technology Attachment (ATA) protocol, Serial-ATA protocol, Parallel-ATA protocol, small computer small interface (SCSI) protocol, enhanced small disk interface (ESDI) protocol, Integrated Drive Electronics (IDE) protocol, Firewire protocol, or any of various other communication protocols.

Software layers within memory system 120 include a storage space 121, firmware 123, and a communication protocol 125. Storage space 121 is a space where data is written. Firmware 123 controls storage space 121 in response to command CMD transferred from host 110. Firmware 123 writes data transferred from host 110 in storage space 121. Firmware 123 reads data written in storage space 121 to sends it to host 110. Firmware 123 erases data written in storage space 121.

Firmware 123 performs background operations on memory system 120. For example, firmware 123 may manage wear leveling of storage space 121 or data retention. Where memory system 120 includes a NAND flash memory, firmware 123 may include a flash translation layer (FTL). In this case, firmware 123 can manage address mapping between logical block addresses and physical block addresses. Firmware 123 may further perform background operations such as merge operations or garbage collection operations.

Communication protocol 125 is used to implement communication between host 110 and memory system 120. Communication protocol 125 can be, for example, a Universal Serial Bus (USB) protocol, a multimedia card (MMC) protocol, a peripheral component interconnection (PCI) protocol, a PCI-express (PCI-E) protocol, an Advanced Technology Attachment (ATA) protocol, a Serial-ATA protocol, Parallel-ATA protocol, small computer small interface (SCSI) protocol, an enhanced small disk interface (ESDI) protocol, an Integrated Drive Electronics (IDE) protocol, a Firewire protocol, or any of various other communication protocols.

Figure 5:
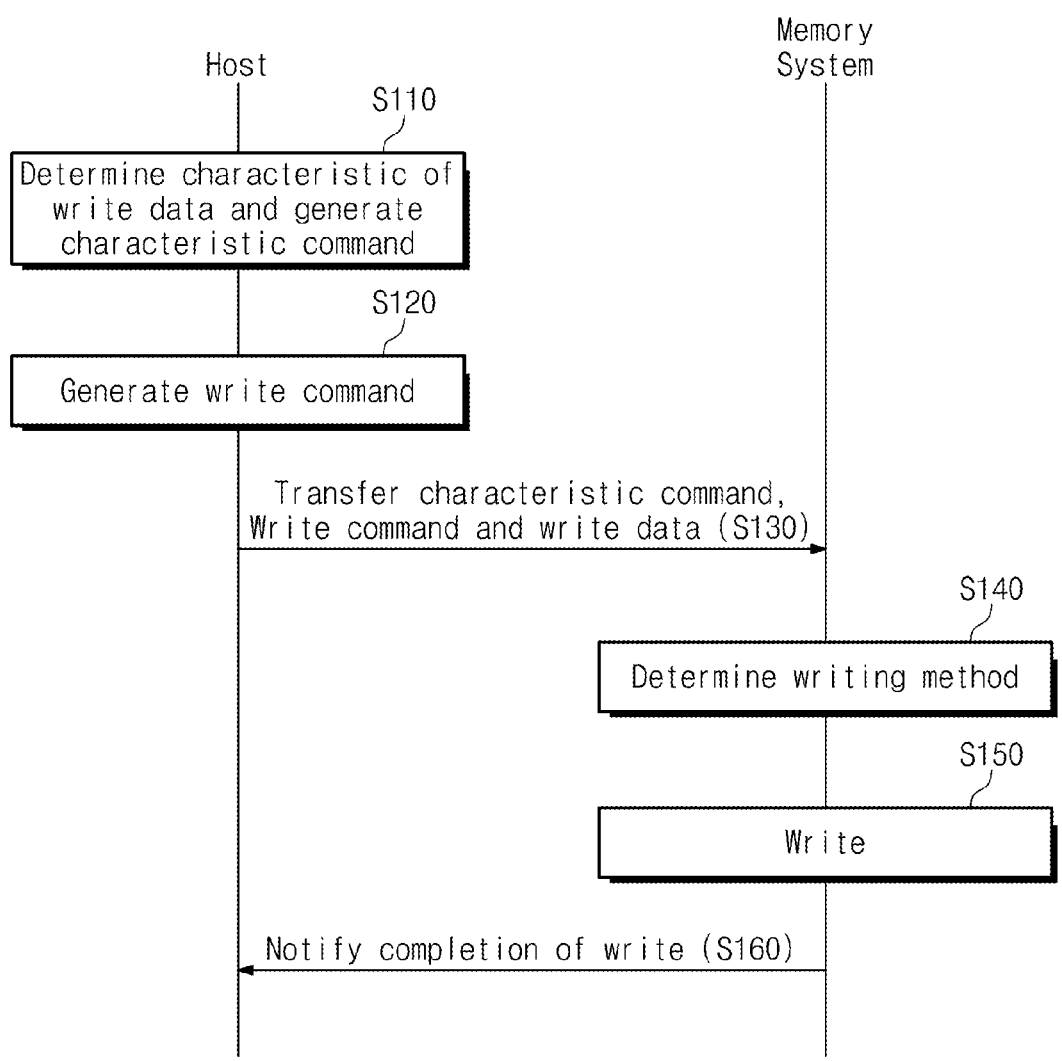
FIG. 5 is a flowchart illustrating a method of writing data in a storage device according to an embodiment of the inventive concept.

FIG. 5 is a flowchart illustrating a method of writing data in storage device 130 according to an embodiment of the inventive concept. In the description that follows, example method steps will be indicated by parentheses (SXXX).

Referring to FIGS. 4 and 5, host 110 determines a characteristic (or, attribute) of write data and generates characteristic information, such as a characteristic command, based on the determination (S110). The characteristic command may include information indicating whether the write data is duplication data, compressed data, multimedia data, or pattern data including an iterative pattern. Host 110 also generates a write command (S120). Operations S110 and S120 can be performed sequentially, simultaneously, in a reverse order, or such that their execution times are partially overlapped.

Host 110 sends the characteristic command, the write command, and the write data to memory system 120 (S130). Then, memory system 120 determines a write method to be used to write the data in memory system 120 (S140). For example, firmware 123 may determine a write method according to the characteristic command.

Next, memory system 120 writes the write data in storage space 121 according to the determined write method (S150), and then memory system 120 notifies host 110 that writing is completed (S160).

Figure 6A:
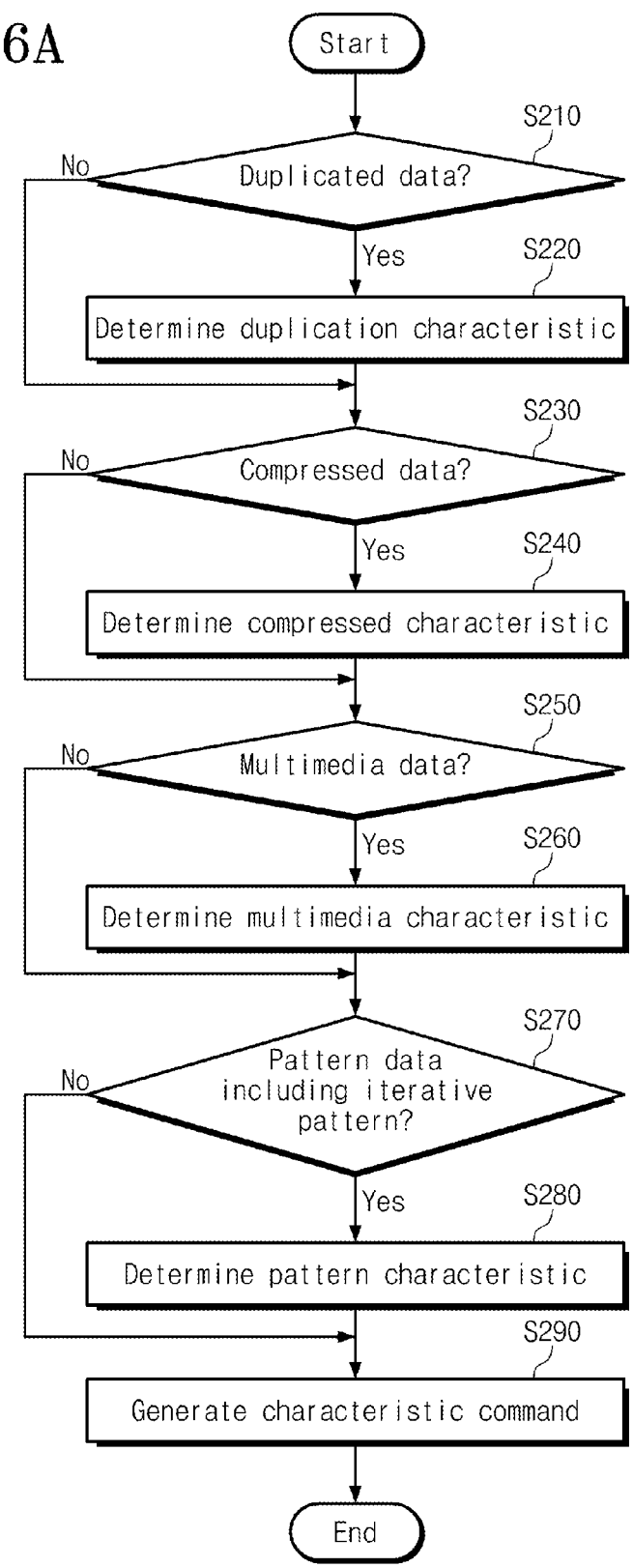
FIG. 6A is a flowchart illustrating an operation of a host according to an embodiment of the inventive concept.

FIG. 6A is a flowchart illustrating an operation of host 110 according to an embodiment of the inventive concept. More specifically, a method of determining a characteristic of write data and generating a characteristic command will be described with reference to FIGS. 4 and 6A.

Referring to FIG. 6A, the method determines whether write data is duplicated data (S210). For example, application 111, operating system 113, or file system 115 of host 110 may determine whether to store in memory system 120 a duplicate copy of source data already stored in memory system 120. Where the write data is duplicated data (S210=Yes), a duplication characteristic is determined (S220). Application 111, operating system 113, or file system 115 of host 110 generates information indicating that the write data is determined to be duplicated data.

Where the write data is not duplicated data (S210=No), the method then determines whether the write data is compressed data (S230). For example, application 111, operating system 113, or file system 115 of host 110 may determine whether the write data is compressed data, based upon a header or an extension of the write data.

Where the write data is compressed data (S230=Yes), a compressed characteristic is determined (S240). Accordingly, application 111, operating system 113, or file system 115 of host 110 may generate information indicating that the write data is determined to be compressed data.

Where the write data is not compressed data (S230=No), the method determines whether the write data is multimedia data (S250). For example, application 111, operating system 113, or file system 115 of host 110 may determine whether the write data is multimedia data, based upon a header or an extension of the write data.

Where the write data is multimedia data (S250=Yes), a multimedia characteristic is determined (S260). Accordingly, application 111, operating system 113, or file system 115 of host 110 may generate information indicating that the write data is determined to be multimedia data.

Where the write data is not multimedia data (S250=No), the method determines whether the write data is pattern data including an iterative pattern (S270). Where the write data is pattern data (S270=Yes), a pattern characteristic is determined (S280). For example, where application 111, operating system 113, or file system 115 of host 110 generates data including an iterative pattern and writes such data in the memory system, the write data may be identified as pattern data. Accordingly, application 111, operating system 113, or file system 115 of host 110 may generate information indicating that the write data is determined to be pattern data.

Finally, a characteristic command is generated (S290). The characteristic command indicates whether write data is duplicated data, compressed data, multimedia data, or pattern data. For example, a communication protocol 119 generates the characteristic command based upon information generated by application 111, operating system 113, or file system 115 of host 110.

Figure 6B:
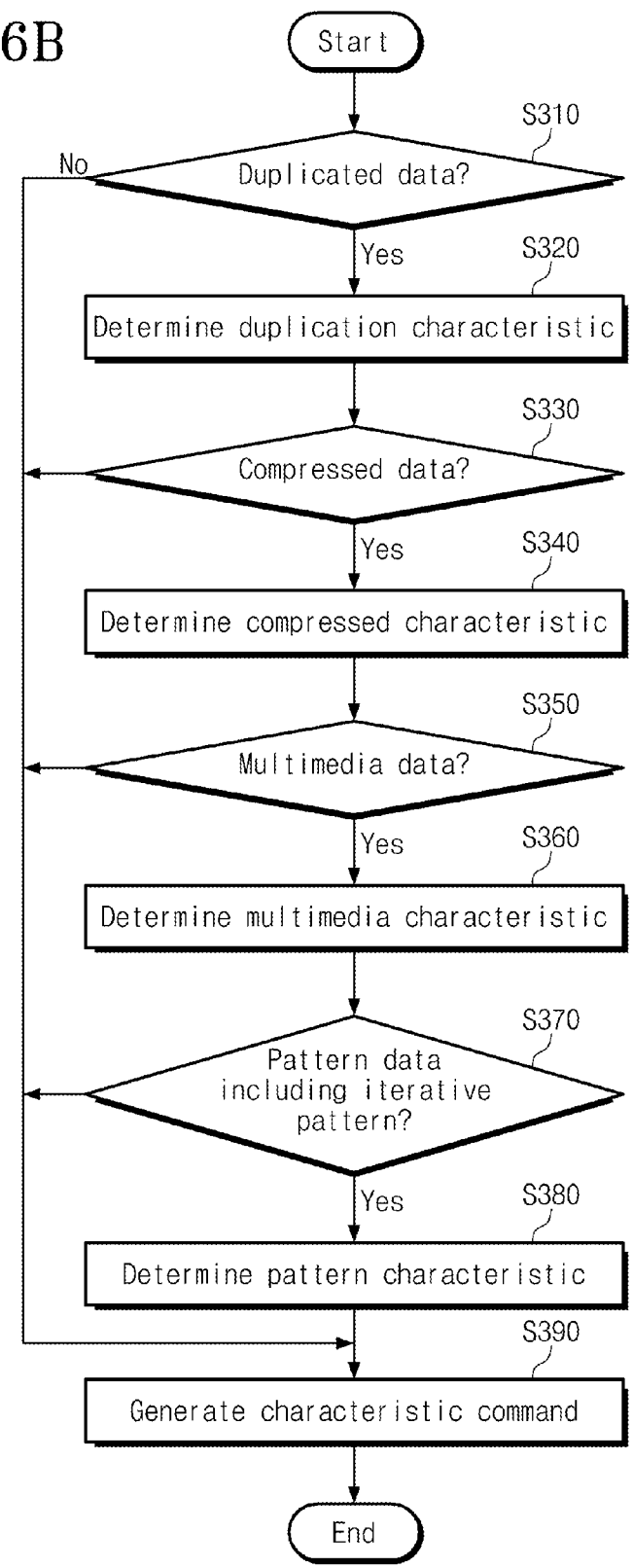
FIG. 6B is a flowchart illustrating an operation of a host according to another embodiment of the inventive concept.

FIG. 6B is a flowchart illustrating an operation of a host according to another embodiment of the inventive concept. More specifically, a method of determining a characteristic of write data and generating a characteristic command will be described with reference to FIGS. 4 and 6B.

Referring to FIG. 6B, where write data is determined to be duplicated data (S310), a duplicated characteristic is determined (S320), and then a characteristic command is generated (S390). Where the write data is determined to be compressed data (S330), a compressed characteristic is determined (S340), and a characteristic command is generated (S390). Where the write data is determined to be multimedia data (S350), a multimedia characteristic is determined (S360) and a characteristic command is generated (S390). Where the write data is determined to be pattern data (S370), a pattern characteristic is determined (S380) and a characteristic command is generated (S390).

FIG. 7 is a diagram illustrating a characteristic command generated by host 110 according to an embodiment of the inventive concept.

Referring to FIG. 7, the characteristic command comprises a command header portion and an attribute portion. The command header portion is formed of 32 bits. A first bit 00 indicates whether write data is duplicated data. Where the write data is duplicated data, first bit 00 is set to '1'. A second bit 01 indicates whether write data is multimedia data. Where the write data is multimedia data, second bit 01 is set to '1'. A third bit 02 indicates whether write data is compressed data. Where the write data is compressed data, third bit 02 is set to '1'. A fourth bit 03 indicates whether write data is pattern data. Where the write data is pattern data, fourth bit 03 is set to '1'. Remaining bits 31:04 are reserved bits.

The attribute portion is formed of 32 bits. First through eighth bits 07:00 include information of a starting logical address of source data. For example, if write data is duplicated data, the first through eighth bits 07:00 may be set up.

Ninth through sixteenth bits 15:08 include information of a starting logical address. The ninth through sixteenth bits 15:08 indicate a starting logical address of a memory system 120 in which write data is stored.

Seventeenth and eighteenth bits 17:16 include length information of a logical address. The seventeenth and eighteenth bits 18:17 indicate a length of a logical address of memory system 120 in which write data is stored.

Nineteenth through twenty sixth bits 25:18 include information of a data pattern. Where write data is pattern data, the nineteenth through twenty sixth bits 25:18 are set up. The nineteenth through twenty sixth bits 25:18 include information associated with an iterative pattern of write data. Remaining bits 31:26 are reserved bits.

The characteristic command described with reference to FIG. 7 is one example of a characteristic command. However, characteristic commands are not limited to the example of FIG. 7.

Figure 8:
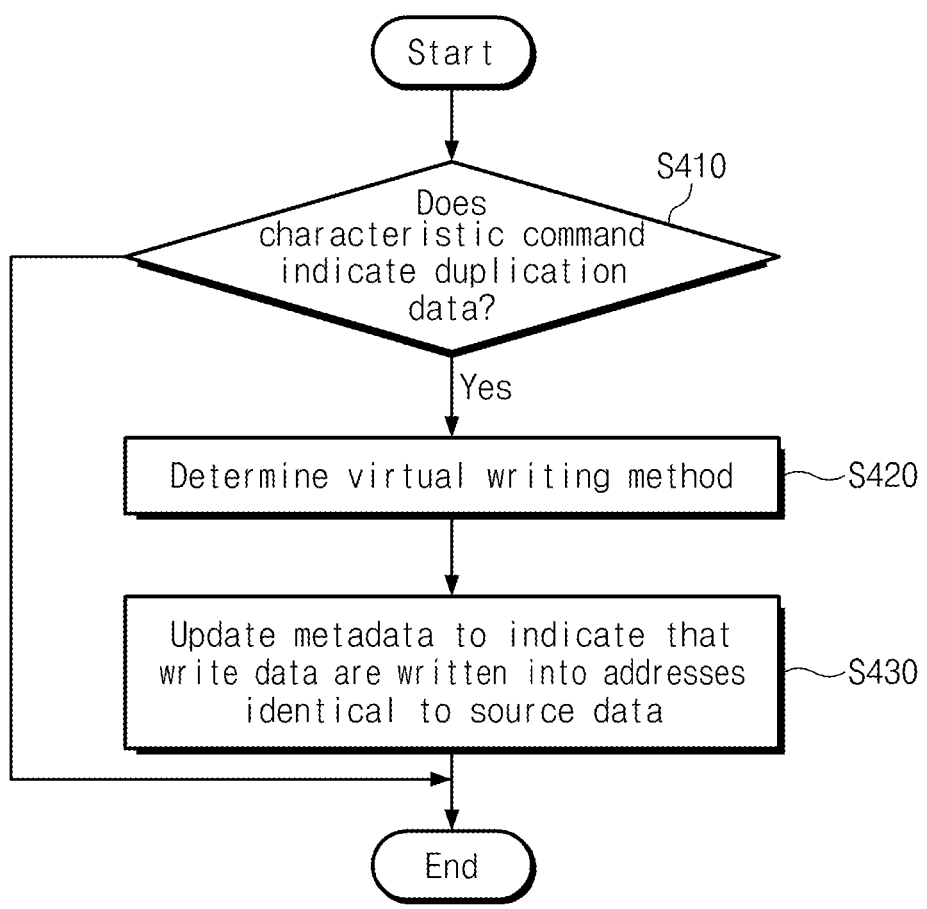
FIG. 8 is a flowchart illustrating an operation of a memory system according to an embodiment of the inventive concept.

FIG. 8 is a flowchart illustrating an operation of memory system 120 according to an embodiment of the inventive concept. More specifically, operations of determining a write method and writing write data according to the determined write method will be more fully described with reference to FIGS. 4 and 8.

The method first determines whether a characteristic command indicates duplication data (S410). For example, firmware 123 determines whether a characteristic command indicates duplication data, based upon a first bit 00 of a command header portion of the characteristic command.

Where the characteristic command indicates the duplication data, firmware 123 determines whether write data input with the characteristic command is duplication data. Firmware 123 detects logical addresses, in which source data is stored, based on first through eighth bits 07:00 of an attribute portion of the characteristic command. Firmware 123 detects logical addresses where write data is to be written based on ninth through eighteenth bits 17:08 of the attribute portion.

Next, firmware 123 determines a virtual write method (S420). Then, metadata is updated to indicate that write data is written into the same addresses as source data (S430). Firmware 123 maintains metadata used to manage a storage space of a storage device 130. The metadata may include mapping information between an address input from a host 110 and an address of storage device 130 corresponding to the address input from a host. For example, the metadata may include mapping information between an address input from a host 110 and a physical address of storage device 130 corresponding to the address input from a host. The metadata may include information as illustrated in following Table 1.

TABLE 1

| Logical addresses from host | Addresses of storage device |
| --- | --- |
| A1:A4 | DA5:DA8 |

Referring to Table 1, first through fourth addresses A1:A4 input from host 110 may correspond to fifth through eighth addresses DA5:DA8 of storage device 130. Data stored at the first to fourth addresses A1:A4 may be source data.

Fifth through eighth addresses DA5:DA8 may correspond to write data. Firmware 123 may update the metadata as if write data is written at the same addresses as source data, without writing of write data in storage device 130. The metadata is updated as illustrated in following Table 2.

TABLE 2

| Logical addresses from host | Addresses of storage device |
| --- | --- |
| A1:A4 | DA5:DA8 |
| A5:A8 | DA5:DA8 |

As described with reference to operation S160 of FIG. 5, memory system 120 notifies host 110 that writing is completed. Firmware 123 updates the metadata without actual writing of write data in storage device 130. Accordingly, it is possible to shorten a time taken to write duplication data.

Figure 9:
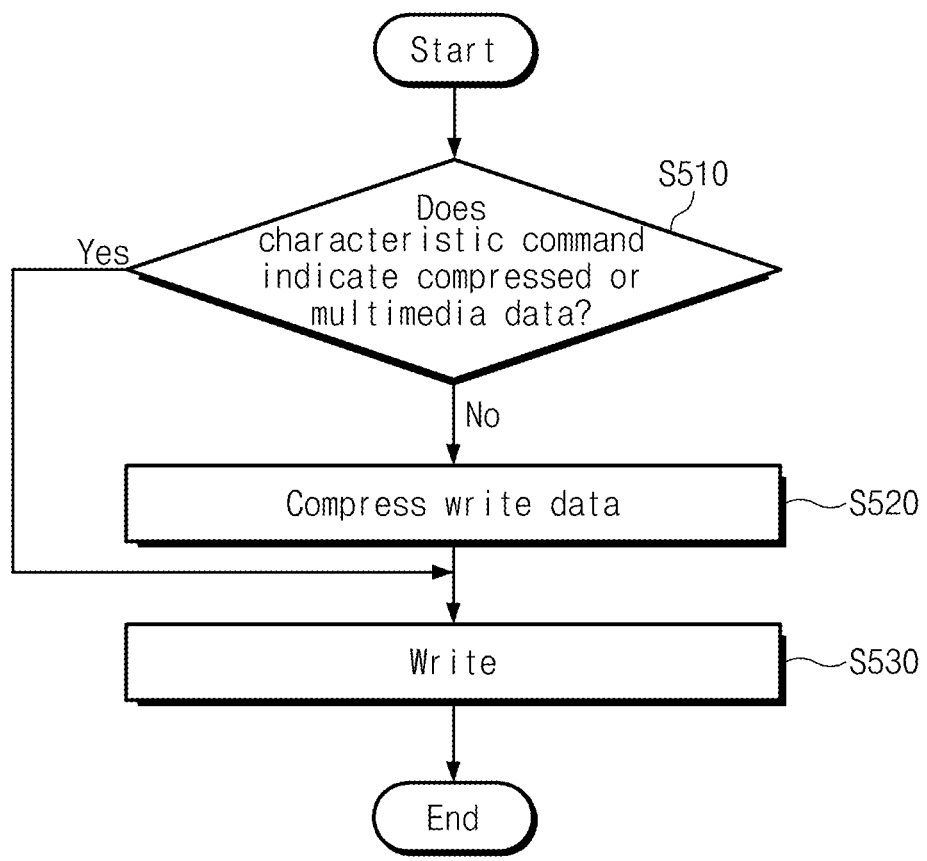
FIG. 9 is a flowchart illustrating an operation of a memory system according to another embodiment of the inventive concept.

FIG. 9 is a flowchart illustrating an operation of a memory system according to another embodiment of the inventive concept. More specifically, operations of determining a write method and writing write data according to the determined write method will be more fully described with reference to FIGS. 4 and 9.

The method first determines whether a characteristic command indicates compressed data or multimedia data (S510). For example, firmware 123 determines whether a characteristic command indicates compressed data or multimedia data, based on second and third bits 02:01 of a command header portion of the characteristic command.

Where the characteristic command does not indicate compressed data or multimedia data, firmware 123 compresses write data (S520). Where the characteristic command indicates compressed data or multimedia data, firmware 123 can skip an operation of compressing write data. Next, a write operation is performed (S530). Firmware 123 writes the write data or the compressed write data in storage device 130.

As described with reference to operation S160 of FIG. 5, afterwards, memory system 120 notifies host 110 that writing is completed.

Compressed data or multimedia data is data which is previously compressed. This means that a compression rate does not increase although compression is further made. Accordingly, it is possible to reduce a write time by skipping a compression operation executed by firmware 123 when write data is compressed data or multimedia data.

In the embodiment of FIG. 9, where compression of write data is skipped, the firmware can add a flag to the metadata to indicate that the write data is uncompressed data. Accordingly, when uncompressed data is read, firmware 123 skips a decompression operation of the read data based upon the flag of the metadata.

Figure 10:
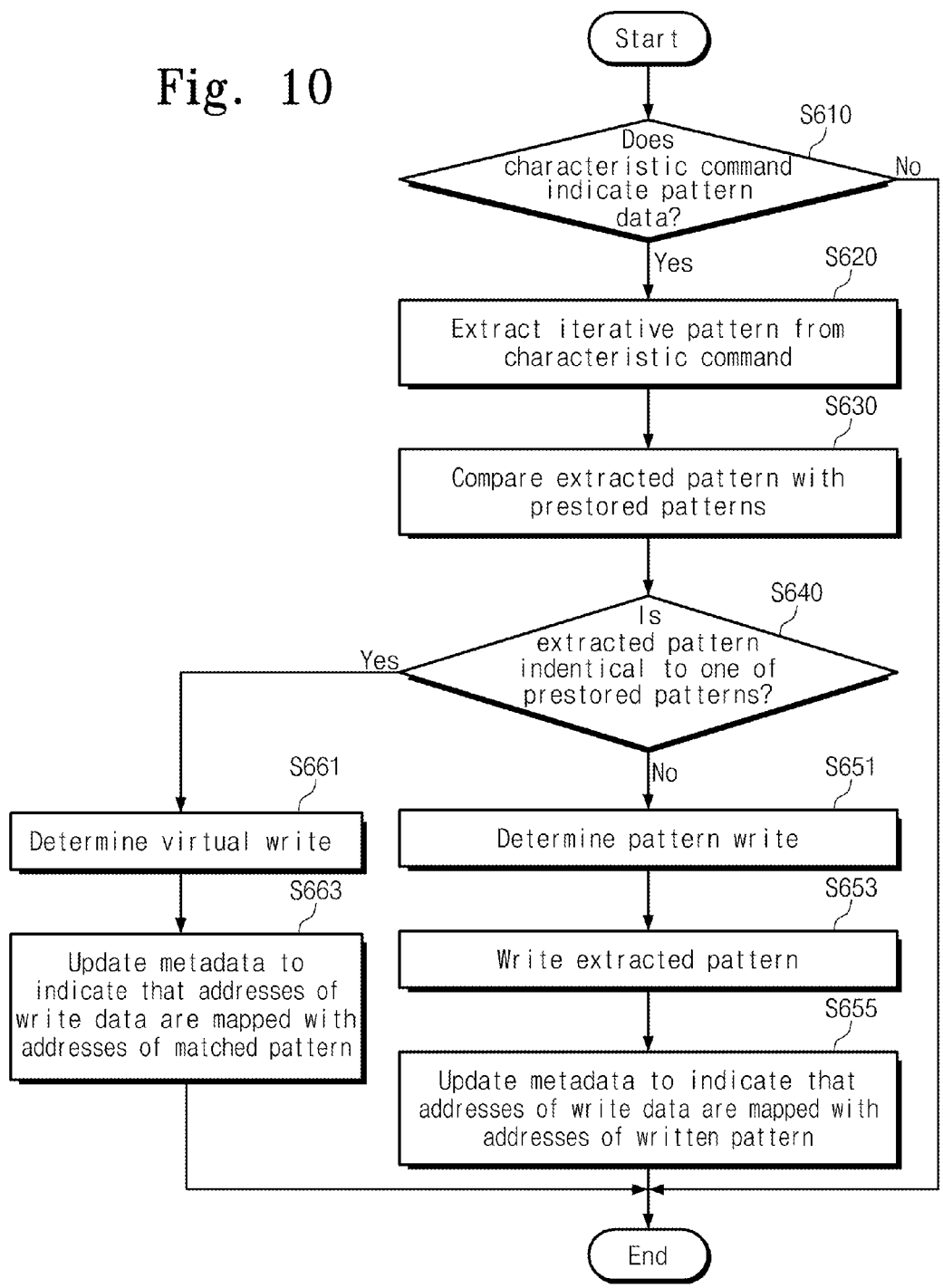
FIG. 10 is a flowchart illustrating an operation of a memory system according to still another embodiment of the inventive concept.

FIG. 10 is a flowchart illustrating an operation of memory system 120 according to another embodiment of the inventive concept. More specifically, operations of determining a write method and writing write data according to the determined write method will be more fully described with reference to FIGS. 4 and 10.

The method first determines whether a characteristic command indicates pattern data (S610). For example, firmware 123 determines whether the characteristic command indicates pattern data, based upon a fourth bit (03) of a command header portion of the characteristic command.

Next, an iterative pattern is extracted from the characteristic command (S620). For example, firmware 123 extracts iterative pattern based upon nineteenth through twenty sixth bits 25:18 of an attribute portion of the characteristic command.

Next, the method determines whether the extracted pattern coincides with one of previously stored patterns (S630). Firmware 123 adds pattern information of written pattern data to metadata whenever pattern data is written in storage device 130. Accordingly, firmware 123 maintains a list on patterns of pattern data previously stored in storage device 130.

Where the extracted pattern does not coincide with any one of previously stored patterns, the method then determines a pattern write method (S651). Thereafter, the extracted pattern is written in storage device 130 (S653). Firmware 123 writes the extracted pattern in storage device 130, and updates the metadata such that a logical address LBA of the write data is mapped to an address of storage device 130 in which the extracted pattern is written (S655). For example, firmware 123 updates the metadata as shown in following Table 3.

TABLE 3

| Logical addresses from host | Addresses of storage device |
| --- | --- |
| A1:A10 | DA1:DA2 |

The extracted pattern is a part of the write data, and iterations of data extraction are used to form the write data. Accordingly, if the extracted pattern and logical address LBA of the write data exist, the write data is recovered by iterating the extracted pattern by a value corresponding to logical address LBA of the write data. In Table 3, first through tenth addresses A1:A10 are addresses transferred from host 110, and the extracted pattern is data written at first and second addresses DA1:DA2 of storage device 130. This means that write data is recovered by iterating a pattern stored at the first and second addresses DA1:DA2 of storage device 130 five times.

As described with reference to operation S160 in FIG. 5, afterwards, memory system 120 notifies host 110 that writing is completed.

If the extracted pattern is matched with any one of previously stored patterns (S640=Yes), a virtual write method is determined (S661). Then, firmware 123 updates the metadata such that addresses of write data are mapped to addresses of storage devices 130 where the matched pattern is stored (S663). For example, firmware 123 updates the metadata as represented in following Table 4.

TABLE 4

| Logical addresses from host | Addresses of storage device |
| --- | --- |
| A1:A10 | DA1:DA2 |
| A11:A30 | DA1:DA2 |

Referring to Table 4, addresses A11:A30 are addresses transferred from host 110, and the matched pattern is data previously written at addresses DA1:DA2 of storage device 130. This means that write data corresponding to addresses A11:A30 is recovered by iterating a pattern stored at addresses DA1:DA2 of storage device 130 ten times.

As described with reference to operation S160 in FIG. 5, afterwards, memory system 120 notifies host 110 that writing is completed.

As described above, where write data is pattern data, a pattern of the write data is stored in storage device 130, instead of all write data. Where a pattern of write data is identical to a pattern previously stored in storage device 130, the pattern of the write data is not written in storage device 130. Accordingly, it is possible to reduce a write time of pattern data.

In the embodiment of FIG. 10, generation of a characteristic command is controlled by application 111, operating system 113, or file system 115. Where write data requires high reliability, generation of a characteristic command may be limited. Consequently, although write data is pattern data or duplication data, memory system 120 writes all write data in storage device 130.

Where the reliability is lowered due to deterioration of storage device 130, application 111, operating system 113, or file system 115 may limit generation of a characteristic command.

Application 111, operating system 113, or file system 115 may limit generation of a characteristic command by checking whether a user limits the generation of the characteristic command.

Figure 11:
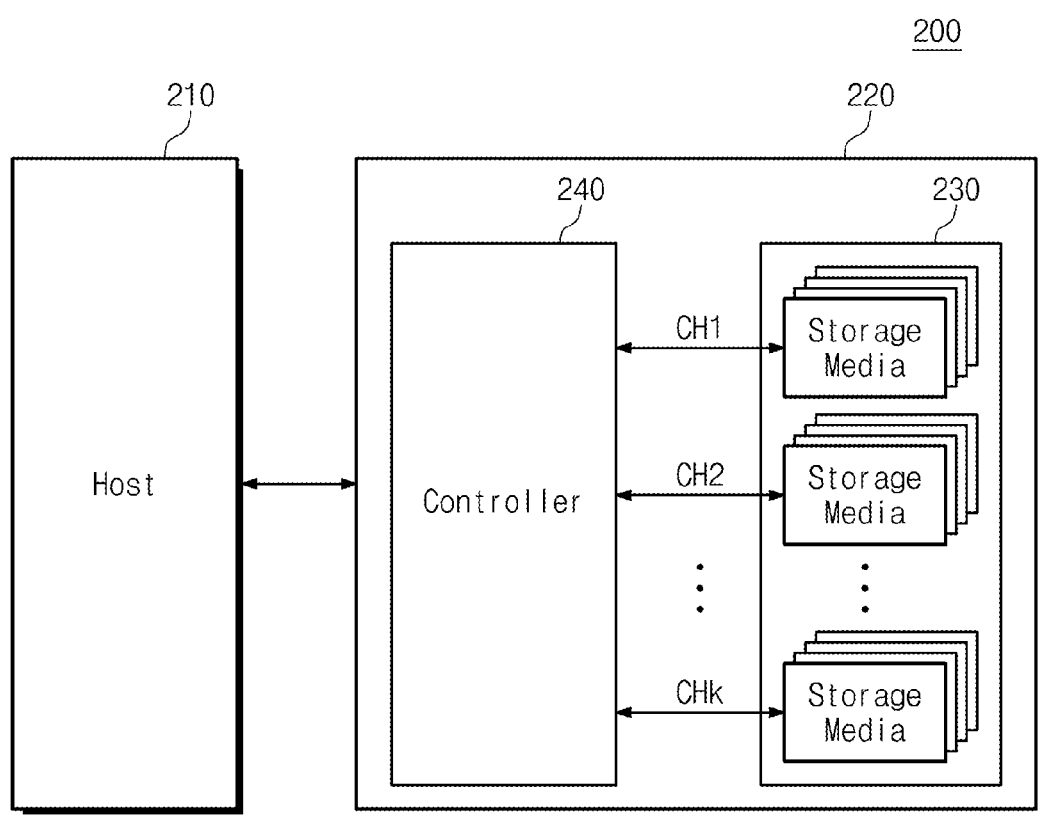
FIG. 11 is a block diagram illustrating a computing system according to another embodiment of the inventive concept.

FIG. 11 is a block diagram illustrating a computing system 200 according to another embodiment of the inventive concept.

Referring to FIG. 11, a computing system 200 comprises a host 210 and a memory system 220. Memory system 220 comprises a controller 240 and a storage device 230. Storage device 230 comprises a plurality of storage media each formed of a memory chip. The storage media communicate with controller 240 via a plurality of channels CH1 through CHk. Multiple storage media are connected in common with one channel.

In some embodiments, storage media of storage device 230 communicates with controller 240 via one channel connected with one storage media.

In the above embodiments, write data is included in a characteristic command. However, the inventive concept is not limited thereto. For example, addresses of write data can be sent to memory system 120 or 220 independent of a write command and a characteristic command. The characteristic command may be used to include addresses associated with a characteristic of write data such as an address of source data, an address of a portion formed of pattern data when a part of write data is pattern data and the like.

As indicated by the foregoing, a write method can be performed differently according to a characteristic of write data. Accordingly, a write method suitable for a characteristic of write data is used, and a write time is reduced.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of writing data in a memory system, comprising:
    determining a characteristic of write data and generating characteristic information according to the determined characteristic;
    generating a write command corresponding to the write data; and
    transmitting the write command, the characteristic information, and the write data to the memory system.

2. The method of claim 1, wherein determining the characteristic of write data and generating the characteristic information comprises:
    determining whether the write data is duplication data of source data stored in the memory system, compressed data, multimedia data, or pattern data including an iterative pattern; and
    generating the characteristic information according the determination.

3. The method of claim 2, wherein if the write data is duplication data of the source data stored in the memory system, the characteristic information includes information associated with a starting logical address of the write data, a length of a logical address of the write data, and a starting logical address of the source data.

4. The method of claim 1, wherein if the write data is compressed data, the characteristic data includes information associated with a starting logical address of the write data and a length of a logical address of the write data.

5. The method of claim 1, wherein if the write data is pattern data, the characteristic information includes information associated with a starting logical address of the write data, a length of a logical address of the write data, and an iterative pattern of the pattern data.

6. The method of claim 1, wherein if a part of the write data is pattern data, the characteristic information includes information associated with a starting logical address of the part of the write data, a length of a logical address of the part of the write data, and an iterative pattern of the pattern data.

7. A method of writing data in a memory system comprising a storage device and a controller configured to control the storage device, comprising:
    receiving a write command, write data, and characteristic information indicating a characteristic of the write data;
    determining a write method of the received write data according to the received characteristic information; and
    writing the received write data in the storage device according to the determined write method.

8. The method of claim 7, wherein if the received characteristic information indicates that the received write data is duplication data of source data stored in the storage device, the write method is determined to be a virtual write method.

9. The method of claim 8, wherein determining the write method of the received write data according to the received characteristic information comprises:
    updating metadata such that the metadata indicates that the write data are written at the same address as the source data; and
    outputting a message indicating that writing of the write data is completed.

10. The method of claim 7, wherein if the received characteristic information indicates that the received write data is not compressed data, the write method is determined to be a compression write method.

11. The method of claim 10, wherein determining a write method of the received write data according to the received characteristic information comprises:

compressing the received write data;

writing the compressed data in the storage device; and outputting a message indicating that writing of the write data is completed.

12. The method of claim 7, wherein if the received characteristic information indicates that the received write data is not multimedia data, the write method is determined to be a compression write method.

13. The method of claim 7, wherein the determining the write method of the received write data according to the received characteristic information comprises:

if the received characteristic information indicates that the received write data is pattern data including an iterative pattern, extracting the iterative pattern from the received characteristic information;

comparing the extracted pattern with previously stored patterns;

if the extracted pattern coincides with one of the previously stored patterns, determining the write method to be a virtual write method; and if the extracted pattern does not coincide with one of the previously stored patterns, determining the write method to be a pattern write method.

14. The method of claim 13, wherein writing the received write data according to the determined write method comprises:

if the write method is determined to be a virtual write method, updating metadata such that a logical address of the write data is mapped to an address in which the coincided pattern is stored; and outputting a message indicating that writing of the write data is completed.

15. The method of claim 13, wherein writing the received write data according to the determined write method comprises:

if the write method is determined to be a pattern write method, writing the extracted pattern in the storage device;

updating metadata such that a logical address of the write data is mapped to an address in which the extracted data is stored; and outputting a message indicating that writing of the write data is completed, wherein writing the received write data according to the determined write method further comprises adding the extracted pattern to the previously stored patterns.

16. A memory system, comprising:

a storage device configured to store data; and a controller configured to control the storage device, wherein the controller receives a write command, write data, and characteristic information indicating a characteristic of the write data, determines a write method of the received write data according to the received characteristic information, and writes the received write data in the storage device according to the determined write method.

17. The memory system of claim 16, wherein if the received characteristic information indicates that the received write data is duplication data of source data stored in the storage device, the write method is determined to be a virtual write method.

18. The memory system of claim 17, wherein determining the write method of the received write data according to the received characteristic information comprises updating metadata such that the metadata indicates that the write data are written at the same address as the source data, and outputting a message indicating that writing of the write data is completed.

19. The memory system of claim 16, wherein if the received characteristic information indicates that the received write data is not compressed data, the write method is determined to be a compression write method.

20. The memory system method of claim 19, wherein determining the write method of the received write data according to the received characteristic information comprises compressing the received write data, writing the compressed data in the storage device, and outputting a message indicating that writing of the write data is completed.

* * * * *